United States Patent
Joncheray et al.

(10) Patent No.: US 10,844,188 B2
(45) Date of Patent: Nov. 24, 2020

(54) ISOCYANATE BASED ORGANIC XEROGELS WITH REDUCED DENSITY

(71) Applicant: Huntsman International LLC, The Woodlands, TX (US)

(72) Inventors: Thomas Julien Joncheray, Warve (BE); Jan Vandenbroeck, Scherpenheuvel-Zichem (BE); Gilles Jean Geumez, Waterloo (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 235 days.

(21) Appl. No.: 15/750,267

(22) PCT Filed: Jun. 16, 2016

(86) PCT No.: PCT/EP2016/063869
§ 371 (c)(1),
(2) Date: Feb. 5, 2018

(87) PCT Pub. No.: WO2017/021047
PCT Pub. Date: Feb. 9, 2017

(65) Prior Publication Data
US 2018/0258250 A1    Sep. 13, 2018

(30) Foreign Application Priority Data
Aug. 6, 2015  (EP) .................. 15179990

(51) Int. Cl.
*C08J 9/28* (2006.01)
*C08G 18/76* (2006.01)
*C08G 18/79* (2006.01)
*C08G 101/00* (2006.01)

(52) U.S. Cl.
CPC ......... *C08J 9/286* (2013.01); *C08G 18/7664* (2013.01); *C08G 18/794* (2013.01); *C08G 2101/0091* (2013.01); *C08J 2201/026* (2013.01); *C08J 2201/0544* (2013.01); *C08J 2205/028* (2013.01); *C08J 2205/042* (2013.01); *C08J 2375/04* (2013.01)

(58) Field of Classification Search
CPC .............. C08J 9/286; C08J 2201/026; C08J 2205/028; C08J 2205/042; C08J 2375/04
See application file for complete search history.

(56) References Cited

U.S. PATENT DOCUMENTS

| 4,644,033 | A | 2/1987 | Gnanou et al. |
| 5,484,818 | A | 1/1996 | De Vos et al. |
| 5,942,553 | A | 8/1999 | Biesmans et al. |
| 6,063,826 | A | 5/2000 | Biesmans et al. |
| 2006/0211840 | A1 | 9/2006 | Lee |
| 2010/0148109 | A1* | 6/2010 | Schadler ............ C08G 18/3243 252/62 |
| 2012/0007012 | A1* | 1/2012 | Fricke .................... C08L 75/04 252/62 |
| 2012/0115969 | A1 | 5/2012 | Fricke et al. |
| 2012/0220679 | A1 | 8/2012 | Fricke et al. |
| 2014/0147607 | A1 | 5/2014 | Leventis et al. |

FOREIGN PATENT DOCUMENTS

| CN | 103012835 A * | 4/2013 | |
| CN | 103012835 A | 4/2013 | |
| WO | 9501009 A | 1/1995 | |
| WO | 9502009 A | 1/1995 | |
| WO | 9503358 A | 2/1995 | |
| WO | 9805591 A | 2/1998 | |
| WO | 2008138977 A | 11/2008 | |
| WO | 2012000917 A | 1/2012 | |
| WO | WO-2012143695 A2 * | 10/2012 | ......... C08G 18/2865 |

* cited by examiner

*Primary Examiner* — Kara B Boyle
(74) *Attorney, Agent, or Firm* — Huntsman International LLC; Robert Diaz

(57) ABSTRACT

A synthesis method for making an isocyanate based organic xerogel having a low density (i.e. <400 kg/m$^3$) and a small pore size (<150 nm) in combination with a specific surface area >100 m$^2$/g is disclosed.

The synthesis method avoiding or reducing gel shrinkage during the solvent removal step is characterized by the step wherein the organic solvent used to synthesize the isocyanate based organic xerogel is replaced by water such that during the solvent removal step only water needs to be removed to dry the porous network and to obtain the isocyanate based organic xerogel.

12 Claims, No Drawings

ISOCYANATE BASED ORGANIC XEROGELS WITH REDUCED DENSITY

CROSS-REFERENCE TO RELATED APPLICATIONS

This application is the National Phase of International Application PCT/EP2016/063869 filed Jun. 16, 2016 which designated the U.S. and which claims priority to European App. Ser. No. 15179990.5 filed Aug. 6, 2015. The noted applications are incorporated herein by reference.

FIELD OF INVENTION

The present invention is related to the synthesis of isocyanate based organic porous materials, more in particular isocyanate based organic xerogels having both low density (<400 kg/m$^3$) and small pore size (<150 nm).

The invention further relates to synthesis methods to fabricate isocyanate based organic xerogels thereby reducing and/or avoiding shrinkage during solvent removal.

The isocyanate based xerogels according to the invention are suitable for use in a lot of applications such as the use as or in insulation products (thermal and/or acoustic).

BACKGROUND

Aerogels and xerogels are porous materials (open pore structure) with pore size typically in the micrometer or even nanometer range.

Isocyanate-based organic aerogels/xerogels (polyurethane and/or polyurea and/or polyisocyanurate based) have also been known and investigated since the early 90s [see U.S. Pat. No. 5,484,818A, U.S. Pat. No. 6,063,826A, U.S. Pat. No. 5,942,553A, WO2012000917A1, US2010148109A1, US20120220679A1, US2012115969A1, WO9502009A1, US20060211840, and US2014147607A1].

Aerogels and xerogels are typically synthesized by first allowing monomers to react in a solvent to form a gel (gelling/gelation step, cross-linked porous network with pores filled with solvent) and then by removal of the solvent. An aerogel is obtained if the solvent is removed from the pores under supercritical conditions (i.e. temperature and pressure are above the critical temperature and critical pressure of the solvent, respectively). A xerogel is obtained if the solvent is removed from the pores under subcritical conditions (i.e. temperature and pressure conditions below the critical point of the solvent). Additional steps in the synthesis such as aging (a known process in which the gel is left standing for a certain period of time to allow further monomer conversion and/or reinforcement of the polymeric network) after gel formation or various solvent exchanges (to wash away unreacted species) can be optionally included to improve final aerogel/xerogel properties.

For a variety of applications including thermal insulation (more in particular superinsulation), besides having pores in the nanometer range (e.g. pore size <150 nm), aerogels/xerogels with a low density are also preferred, and therefore shrinkage during solvent removal should be avoided or at least minimized. However only little work has been reported regarding minimizing isocyanate-based xerogel shrinkage during solvent removal under subcritical conditions.

Solvent removal under supercritical conditions to synthesize aerogels is therefore usually preferred because of the absence of capillary forces. Nevertheless, supercritical drying (typically done with $CO_2$ in its supercritical state) is time consuming and requires expensive equipment (autoclave . . . ). Subcritical conditions to synthesize xerogels are less expensive to implement since they do not require complex drying equipment, but minimizing gel shrinkage often remains a challenge due to the strong capillary forces involved.

A robust technique has been previously identified for inorganic silica xerogels which consists in reacting residual surface SiOH groups with chlorotrimethylsilane before solvent removal [see WO9805591A1 and WO9805591]

CN 103 012 835 discloses a process to fabricate cellulose based aerogels and first forms in a suitable solvent a gel made of cellulose and in a subsequent step (after the gelling step) they add isocyanates to the cellulose gel to react the remaining OH groups with isocyanate in order to form urethane bondings to improve the mechanical properties of the cellulose based aerogel. The obtained aerogel is an isocyanate modified chemically cross-linked cellulose aerogel skeleton. The surface of the cellulose aerogel is hereby coated with reacted isocyanate.

Several approaches have been previously explored to minimize shrinkage of isocyanate-based xerogels, such as increasing pore size (i.e. reduced capillary forces), building a stiffer polymeric network (e.g. PIR/polyurea/polyurethane with stiffer polyols, starting from higher monomer concentrations, reaching higher conversions, playing with curing/aging temperature/time, playing with catalyst type/level . . . ), using evaporation solvents with lower surface tensions (i.e. reduced capillary forces) and playing with solvent evaporation conditions (pressure and temperature) but none of these approaches have been successful to produce isocyanate-based xerogels which have a low density (i.e. <400 kg/m$^3$) and small pore size (<150 nm) in combination with a specific surface area >100 m$^2$/g.

WO2008138977A1 describes a synthesis process where the isocyanate-based gel is first made in a solvent, followed by a gel modification step and ultimately by removal of the solvent under subcritical conditions. The benefit claimed versus other approaches is that no solvent exchange is needed. Although in the xerogel example involving isocyanates (TDI, toluene diisocyanate) pore size is well below 150 nm (~23 nm, example 9), xerogel density remained relatively high above 800 kg/m$^3$ (876 kg/m$^3$), which would lead to a very poor thermally insulating material.

There is hence a need to develop a synthesis method to make isocyanate based xerogels which avoids or at least reduces significantly gel shrinkage during solvent removal such that a low xerogel density can be achieved even in the presence of small pores.

GOAL OF THE INVENTION

It is the goal of the invention to develop a synthesis method to provide isocyanate based organic xerogels which avoids or at least reduces significantly gel shrinkage during solvent removal such that a low xerogel density can be achieved even in the presence of small pore size.

Therefore, the present invention relates to isocyanate based organic xerogels having both low density (<400 kg/m$^3$) and small pore size (<150 nm) and the use of these isocyanate based organic xerogels for superior thermal and/or acoustic insulation, to achieve superior fire properties, waterproof properties, . . . and many more.

SUMMARY OF THE INVENTION

According to the invention, a synthesis method for making an isocyanate based organic xerogel thereby avoiding or reducing gel shrinkage during the solvent removal step is disclosed, said method comprises at least the following steps:

a) Providing a polyisocyanate composition, and
b) Optionally providing an isocyanate reactive composition, and
c) Optionally providing at least one catalyst compound promoting a polyurethane and/or polyurea and/or polyisocyanurate formation (trimerization), and
d) Providing an organic non-reactive (towards isocyanates) solvent composition, and
e) Optionally providing further additives, and then
f) Combining compositions/compounds a), d) and optionally b) and/or c) and/or e) to form a gel comprising a porous cross-linked polyurethane and/or polyurea and/or polyisocyanurate network (having pores filled with solvent at this stage), this step referred to as "gelling" step, and then
g) Optionally removing unreacted species, and then
h) Exchanging the organic solvent with water, and then
i) Drying the porous network under subcritical conditions in order to remove the water and obtain the isocyanate based organic xerogel (gas-filled pores, e.g. with air).

According to embodiments, the synthesis method according to the invention further comprises after the gelling step, a step wherein the obtained gel is a monolithic gel which is optionally broken or grinded into particles having smaller dimensions.

According to embodiments, the synthesis method according to the invention further comprises after the gelling step, a step wherein the obtained monolithic gel or particles are aged.

According to embodiments, the polyisocyanate composition is selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate.

According to embodiments the isocyanate reactive composition is selected from the group of aliphatic and aromatic monoamine/polyamine compounds, aromatic and aliphatic polyether and/or polyester monool/polyol compounds and mixtures thereof, preferably polyethers, more preferably polyalkylene polyethers having an average nominal hydroxy functionality of 1-8 and an average molecular weight of 32-8000 g/mol.

According to embodiments, the step of combining the compositions/compounds a), d) and optionally b) and/or c) and/or e) is performed by mixing or simply shaking the reaction vessel or by slowly stirring the mixture at temperatures in the range of from about 10° C. to about 100° C., preferably 15 to 30° C., and then the mixture is left standing for a certain period of time to form a gel.

According to embodiments, the catalyst compound(s) used are selected from at least a trimerization catalyst selected from quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives and the ratio isocyanates/isocyanate reactives (NCO Index) is >100, preferably >200, more preferably >300 and wherein the obtained isocyanate based organic xerogel is a polyisocyanurate (PIR) comprising xerogel.

According to embodiments, the catalyst compound(s) used are selected from at least a polyurethane catalyst selected from aliphatic and aromatic tertiary amines such as N,N-dimethyl cyclohexylamine, organometallic compounds, especially tin compounds such as stannous octoate and dibutyltin dilaurate, alkali metal salts and the ratio isocyanates/isocyanate reactives (NCO Index) is below 200, preferably in the range 50-150, more preferably in the range 80-120 and wherein the obtained isocyanate based organic xerogel is a polyurethane (PUR) and/or polyurea comprising xerogel.

According to embodiments, the step of drying the porous network under subcritical conditions in order to remove the water in step i) is performed by air-drying under ambient/atmospheric pressure or drying under vacuum (reduced pressure), at room temperature or at elevated temperatures in an oven.

According to embodiments, the step of exchanging the organic gelling solvent (if immiscible with water) by water is done in two steps by first replacing the water-immiscible organic gelling solvent by a water-miscible solvent followed by a second solvent exchange with water.

According to embodiments, the organic solvents used are selected from hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers and mixtures of such compounds.

According to embodiments, the synthesis method according to the invention further comprises after the gelling step a step to add one or more functionalization molecules optionally dissolved in an organic solvent, said functionalization molecules having at least one reactive group (A) being capable of binding to the pore surface of the porous network (by reaction with residual reactive groups (B) present on the pore surface) and at least one functional group (C) capable of providing the porous network with the desired functionalization.

The invention further discloses an isocyanate based organic xerogel obtained by the synthesis method according to the invention.

According to embodiments, the isocyanate based organic xerogel according to the invention has the following properties:

Density: lower than 400 kg/m$^3$, preferably lower than <300 kg/m$^3$, more preferably lower than <250 kg/m$^3$ Average pore size: lower than <150 nm, preferably 5 to 100 nm Specific surface area: larger than >100 m$^2$/g, preferably larger than >150 m$^2$/g, more preferably larger than 200 m$^2$/g.

According to embodiments, the isocyanate based organic xerogel according to the invention has a lambda value under atmospheric pressure in the range 9-50 mW/m·K at 10° C. together with a low density <400 kg/m$^3$.

The invention further discloses the use of the isocyanate based organic xerogel according to the invention as such and/or for preparing foams and/or for combining with fillers and/or to make composite materials, to achieve improved thermal and/or acoustic insulating properties, improved fire retardancy, waterproof properties and/or improved mechanical strength, . . . .

DEFINITIONS AND TERMS

In the context of the present invention the following terms have the following meaning:
1) The term "isocyanate index" or "NCO index" or "index" as used herein means the ratio of NCO-groups over isocyanate-reactive hydrogen atoms present in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen used in a formulation.
The NCO value as indicated in the examples is measured using a measurement method based on titration. The isocyanate is reacted with an excess of di-n-butylamine to form ureas. The unreacted amine is then titrated with standard nitric acid to the colour change of bromocresol green indicator or to a potentiometric endpoint. The percent NCO or NCO-value is defined as the percent by weight of NCO-groups present in the product.
Further, it should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.
2) The term "polyisocyanate based" or "isocyanate based" xerogel as used herein means that the xerogels of the present invention can be of the following types: polyurethane xerogels, polyurea xerogels, polyisocyanurate xerogels, polyisocyanurate/polyurethane xerogels, polyurea/polyurethane xerogels, polyallophanate xerogels, polybiuret xerogels.
3) The term "Composite" as used herein refers to materials made from two or more constituent materials with significantly different physical or chemical properties, that when combined, produce a material with characteristics different from the individual components. The individual components remain separate and distinct within the finished structure.
4) The terms "organic porous materials", "isocyanate based organic porous materials", "isocyanate based porous materials", and "isocyanate based organic xerogels" as used herein are limited in this invention towards materials having densities lower than 800 kg/m$^3$, preferably in the range from 30 to 500 kg/m$^3$. The surface area of the xerogel of the present invention is up to 1500 m$^2$/g. Surface areas can be determined, for example, using the Brunauer, Emmett Teller (BET) method.
5) The expression "monolith" refers to a continuous piece (i.e. defect/crack-free) of a porous material (having solvent-filled pores before the solvent removal step and herein referred to as "monolithic gel" or having gas-filled pores after the solvent removal step). The dimensions of a monolith are typically determined by the size of the container in which gelation is performed. Monoliths can therefore have dimensions as large as hundreds or thousands of cubic centimeters. A grinded/cut monolith results in "particles" (solvent-filled pores before the solvent removal step or gas-filled pores after the solvent removal step). Grinding/cutting can be performed anytime after the gelation step, on a monolith with or without solvent-filled pores. Particle size is determined by the grinding/cutting process.
6) The expressions "isocyanate-reactive compounds", "NCO-reactive compounds" "isocyanate-reactive hydrogen atoms" and "isocyanate-reactive groups" as used herein refer to active hydrogen atoms in hydroxyl and amine groups present in the isocyanate reactive compounds. Compounds having one hydroxyl group are considered to comprise one reactive hydrogen, compounds having one primary amine group are considered to comprise one reactive hydrogen and one water molecule is considered to comprise two active hydrogens.
7) The word "average" as used herein refers to number average unless indicated otherwise.
8) "Lambda value" as used herein refers to the thermal conductivity of a material (also known as k value) normally expressed in mW/m·K. The lower the lambda value the more insulating the material (i.e. better thermal insulation performance).
9) "Acoustic insulation" as used herein refers to reducing sound pressure with respect to a specified sound source and receptor.
10) "Subcritical conditions" as used herein refers to temperature and pressure conditions below the critical point of the solvent.
11) "Density" as used herein refers to xerogel density (in kg/m$^3$) measured by dividing the mass of a xerogel monolith or particle (measured with an analytical balance) by its volume (measured with a caliper).

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a compound comprising components X and Y" should not be limited to compounds consisting only of components X and Y. It means that with respect to the present invention, the only relevant components of the compound are X and Y.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

According to a first aspect of the invention, a synthesis method for making an isocyanate based organic xerogel is disclosed which avoids or at least reduces drastically gel shrinkage during the solvent removal step. Said synthesis method is characterized by the fact that during the solvent removal step the organic solvent used to synthesize the isocyanate based organic xerogel is replaced by water such that during the solvent removal step only water needs to be removed to dry the porous network and obtain the isocyanate based organic xerogel (gas-filled pores, e.g. with air).

The synthesis method for making the isocyanate based organic xerogel according to the invention which avoids or at least reduces drastically gel shrinkage during the solvent removal step comprises at least the following steps of:
a) Providing a polyisocyanate composition, and
b) Optionally providing an isocyanate reactive composition, and
c) Optionally providing at least one catalyst compound promoting a polyurethane and/or polyurea and/or polyisocyanurate formation (trimerization), and
d) Providing an organic non-reactive (towards isocyanates) solvent composition, and
e) Optionally providing further additives, and then
f) Combining compositions/compounds a), d) and optionally b) and/or c) and/or e) to form a gel comprising a porous cross-linked polyurethane and/or polyurea and/or polyisocyanurate network (having pores filled with solvent at this stage), this step is also referred to as "gelling" step, and then
g) Optionally removing unreacted species, and then
h) Exchanging the organic solvent with water, and then
i) Drying the porous network under subcritical conditions in order to remove the water and obtain the isocyanate based organic xerogel (gas-filled pores, e.g. with air).

According to embodiments, the isocyanate based organic xerogel obtained by the method according to the invention preferably has a low density (i.e. <400 kg/m$^3$) and a small pore size (<150 nm) in combination with a specific surface area >100 m$^2$/g.

According to embodiments, after the gelling step, the obtained gel is a monolithic gel which may be further broken or grinded into particles having smaller dimensions.

According to embodiments, after the gelling step, the obtained gel is aged.

According to embodiments, the step of optionally removing unreacted species in the obtained gel (monolith or particles) is performed by washing the gel with fresh organic solvent. Said organic solvent may be the same or different from the organic solvent used to form the monolithic gel.

According to embodiments, the polyisocyanate composition is preferably selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenyl-methane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of isocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

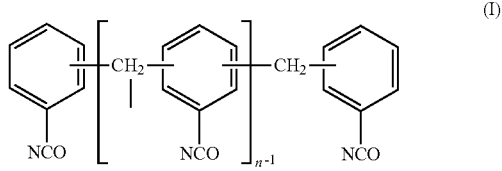

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the isocyanate reactive composition is selected from isocyanate reactive compounds having active-hydrogen atoms. These isocyanate reactive compounds can be selected from the group of aliphatic and aromatic monoamine/polyamine/aminosilane compounds, aromatic and aliphatic polyether and/or polyester monool/polyol compounds and mixtures thereof. Among the polyethers in particular suitable herein are the polyalkylene polyethers.

The monool and/or polyol compounds suitable in the present invention preferably have an average nominal hydroxy functionality of 1-8 and an average molecular weight of 32-8000 g/mol. Mixtures of monools and/or polyols may be used as well. Examples of such monools are methanol, ethanol, propanol, butanol, phenol, cyclohexanol, hydroxy acrylates (e.g. HEMA, hydroxy ethyl methacrylate) and hydrocarbon monools having an average molecular weight of 32-6000 g/mol like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000 g/mol, polyester polyols having an average molecular weight of 200-8000 g/mol, polyether polyester polyols having an average molecular weight of 200-8000 g/mol and polyether polyols having an average molecular weight of 200-8000 g/mol. Such monools and polyols are commercially available. Useful examples are Daltocel® F555 and Daltocel® F442, which are all polyether triols from Huntsman, Voranol® P400 and Alcupol® R1610, which are polyether polyols from DOW and Repsol®, respectively, and Priplast® 1838 and 3196 which are high molecular weight polyester polyols from Croda, and Capa® 2043 polyol, a linear polyesterdiol of average MW of about 400 g/mol from Perstorp, and K-flex® polyols 188 and A308 which are polyester polyols from King Industries having a MW of about 500 and 430 g/mol respectively, and aromatic polyester polyols like Stepanpol® PH56 and BC180 having average molecular weights of about 2000 g/mol and 600 g/mol respectively, and Neodol® 23E which is an aliphatic monool from Shell. Most preferred are polyester and polyether polyols having an average molecular weight of 200-6000 g/mol and an average nominal functionality of 1-8.

According to embodiments, the catalysts used to promote a polyurethane and/or polyurea and/or polyisocyanurate formation (trimerization) in the gelling step f) are such that the polyisocyanate/catalyst weight ratio varies between 1 and 50000. The preferred polyisocyanate/catalyst weight ratio depends on formulation parameters such as for instance the amount/type of polyisocyanate used, the amount/type of isocyanate reactive compound, the reaction/cure temperature, the solvent used, additives used, the index, . . .

Polyurethane catalysts for use in the present preparation methods include any of those catalysts known in the art to promote urethane and/or urea reaction. Suitable urethane catalysts include aliphatic and aromatic tertiary amines such as N,N-dimethylcyclohexyl amine, organometallic compounds, especially tin compounds such as stannous octoate and dibutyltin dilaurate, alkali metal salts.

Trimerisation catalysts for use in the present preparation method include any isocyanate trimerisation catalyst known in the art such as quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat® 41 available from Abbott Laboratories, and DABCO® TMR, TMR-2 and TMR-4 available from Air Products.

Mixtures of trimerisation catalysts and urethane catalysts can be used in any combination. The composition of the catalyst package will depend on the desired reaction profile.

According to embodiments, the polyisocyanate composition, the catalyst compound(s), the solvent and optionally the isocyanate reactive compositions and additives are mixed by simply shaking the reaction vessel or by slowly stirring the mixture. The polyisocyanate composition, the catalyst compound(s), the solvent and optionally the isocyanate reactive compositions and additives, optionally in the form of a dispersion, are first mixed and subsequently the catalyst is added hereto. Mixing can be done at room temperature or at somewhat higher temperatures. Preferably, the mixture is left standing for a certain period of time to form a gel. This time period varies from 1 minute to several weeks depending on the system and the targeted pore size and density. The resulting gel can optionally be aged as well from several minutes to several weeks. Temperatures in the range of from about 10° C. to about 100° C., preferably 15 to 30° C. may be employed, a temperature of about at least 10° C. below the boiling point of the solvent used being preferred.

According to embodiments, the step of combining the polyisocyanate composition, catalyst compound(s), solvent, and optionally the isocyanate reactive composition and additives is such that a mainly polyisocyanurate (PIR) comprising gelling formulation is achieved. To achieve a mainly polyisocyanurate (PIR) comprising gelling formulation the catalyst used is selected from at least a trimerization catalyst and the ratio isocyanates/isocyanate reactives (NCO Index) is >100, preferably >200, more preferably >300.

According to embodiments, the step of combining the polyisocyanate composition, the isocyanate reactive composition, catalyst compound(s), solvent and optional additives is such that a mainly polyurethane (PUR) and/or polyurea comprising gelling formulation is achieved. To achieve a mainly polyurethane (PUR)/polyurea comprising gelling formulation the catalyst compound(s) used are selected from at least a polyurethane catalyst and the ratio isocyanates/isocyanate reactives (NCO Index) is below 200, preferably in the range 50-150, more preferably in the range 80-120.

According to embodiments, the synthesis method may further comprise after the gelling step a step to add one or more functionalization molecules (further referred to as "functionalization step"). This functionalization step comprises the additional step of adding at least one functionalization molecule optionally dissolved in an organic solvent and optionally in the presence of a catalyst to the gel comprising a porous cross-linked polyurethane and/or polyurea and/or polyisocyanurate network. Said functionalization molecules have at least one reactive group (A) being capable of binding to the pore surface of the porous network and at least one functional group (C) providing the porous network with the desired functionalization and forming a functionalized porous network. Preferably the reactive group (A) in the functionalization molecule is chosen such that it is capable of chemically reacting (covalent bond formation) with residual reactive groups (B) being present after gel formation on the pore surface of the porous (solvent filled) polyurethane, and/or polyurea and/or polyisocyanurate monoliths or particles. The presence of these residual reactive groups (B) is achieved by accurate control of the composition, type and weight ratios of the polyisocyanate composition, the optional isocyanate reactive composition, catalyst and optional additives used in the gelling step. After the functionalization step, it might be required to remove the remaining unreacted functionalization molecules.

The main advantage of adding the functionalization molecules after the step of forming a gel (gelation step, solvent-filled pores) comprising porous polyurethane and/or polyurea and/or polyisocyanurate monoliths or particles (and after optionally aging the gel and/or removing unreacted species) and before drying the gel comprising functionalized porous polyurethane and/or polyurea and/or polyisocyanurate monoliths or particles (versus during gelation or after solvent removal) is that it has no influence on gel formation (does not interfere with porous cross-linked network formation) and its flexibility/control over how functionalization takes place.

According to embodiments, the functional group (C) in the functionalization molecules used to functionalize the isocyanate based organic xerogel according to the present invention may be selected from functional groups having hydrophobic properties. Examples of said functional groups are polyalkylsiloxanes such as PolyDiMethylSiloxanes (PDMS), long aliphatic carbon chains (saturated/unsaturated, e.g. fatty acid derivatives), fluorinated/perfluorinated groups, Polyethylene, Polypropylene, Polybutadiene, Polyisoprene, . . . .

According to embodiments, the functional group (C) in the functionalization molecules used to functionalize the isocyanate based organic xerogel according to the present invention may be selected from functional groups having hydrophilic properties. Examples of said functional groups are polyethylene oxide, polyvinyl alcohol, carboxylic acids, sugars, organic/inorganic salts, polyalcohols, cellulose, . . .

According to embodiments, the functional group (C) in the functionalization molecules used to functionalize the isocyanate based organic xerogel according to the present invention may be selected from functional groups having resistance or low reaction to fire. Examples of said functional groups are inorganic-based groups such as aluminium or magnesium-based functional groups (preferably oxides), aromatic groups such as polyimide, polybenzimidazole, . . . phosphorous or nitrogen-containing functional groups, halogenated groups such as brominated or chlorinated functional groups, . . .

According to embodiments, the functional group (C) in the functionalization molecules used to functionalize the isocyanate based organic xerogel according to the present invention may be selected from functional groups having selective adsorption (e.g. selective adsorption of cholesterol, sugars, metal cations, gases, . . . ). Examples of said functional groups are cyclodextrins, calixarenes, crown ethers and proteins.

According to embodiments, the functional group (C) in the functionalization molecules used to functionalize the isocyanate based organic xerogel according to the present invention may be selected from functional groups having pH responsive properties. Examples of said functional groups are acids and bases (polysulfates, polyacrylic acid, Chitosan . . . ).

According to embodiments, the step of evaporating/drying the gel comprising porous polyurethane and/or polyurea and/or polyisocyanurate monoliths or particles (optionally functionalized) for making an isocyanate based organic xerogel according to the invention is performed by first exchanging the organic solvent being present in the gel by water and then removing the water under subcritical conditions (e.g. air-drying under ambient/atmospheric pressure, drying under vacuum, drying in an oven at elevated temperatures . . . ). It was surprisingly found that when water is used as evaporating/drying solvent, especially when removing it from the pores under reduced pressure (i.e. vacuum), it allows the production of isocyanate based xerogels with significantly reduced density compared to when using other common organic solvents. Although evaporating/drying under atmospheric/ambient conditions is possible, evaporating/drying under reduced pressure (e.g. vacuum) is preferred to achieve minimal shrinkage. The evaporating/drying step can take from at least 1 second to a week but is generally less than 6 hours.

The crucial step of exchanging the organic gelling solvent by water is preferably done in one exchange, without using an intermediate (additional) solvent (if the gelling solvent is miscible with water, e.g. when the organic solvent used is acetone or THF). More than 1 exchange may however be needed to replace the organic gelling solvent by water (if the organic gelling solvent has for instance limited solubility with water). In this latter case it can be achieved by first replacing a water-immiscible gelling solvent (e.g. dichloromethane) by a water-miscible solvent (e.g. acetone or THF), followed by a second solvent exchange with water.

According to embodiments, the organic solvents to be used in the synthesis method according to the present invention may be selected from hydrocarbons, aromatics, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene

Suitable aromatic organic solvents include toluene, benzene, xylenes . . . .

Suitable fluorine-containing ethers which may be used as organic solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Another suitable organic solvent is N-methyl pyrolidone.

Preferred organic solvents for use in the method according to the present invention are dichloromethane, acetone, n-pentane, ethyl acetate, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/ CFC 11 mixtures.

Further suitable additives to be used in the process of the present invention and further suitable processing methods are described in WO 95/03358, which is incorporated herein by reference.

According to a second aspect of the invention, an isocyanate based organic xerogel having a low density (i.e. <400 kg/m³) and a small pore size (<150 nm) in combination with a specific surface area >100 m²/g is provided, said isocyanate based organic xerogel being obtainable/obtained by the method according to the invention.

The isocyanate based organic xerogel according to the invention may have functional groups attached to the pore surface of the isocyanate based organic xerogel. In case the xerogel comprises functional groups, said groups are present in an amount of at least 0.1% by weight functionalization molecules calculated on the total dry weight of the (functionalized) xerogel and said molecules are attached to the pore surface of the cross-linked porous network.

The isocyanate based organic xerogel according to the invention, which can be made in the form of monoliths or particles, comprises an isocyanate based cross-linked porous network structure made of polyurethane and/or polyisocyanurate and/or polyurea (optionally having specific functional groups of interest attached to the pore surface).

According to embodiments, the xerogel according to the invention may be in the form of a monolith or a broken/ grinded monolith (also referred to as "particle(s)").

According to embodiments, the isocyanate based organic xerogels according to the present invention are nanoporous materials.

According to embodiments, the isocyanate based organic xerogel according to the present invention comprises porous xerogel monoliths or particles having the following properties:
  Density: lower than <400 kg/m³, preferably lower than <300 kg/m3, more preferably lower than <250 kg/m³
  Average pore size: lower than <150 nm, preferably 5-100 nm
  Specific Surface Area: larger than >100 m²/g, preferably larger than 150 m²/g, more preferably larger than 200 m²/g.

According to embodiments, the isocyanate based organic xerogel according to the present invention comprises porous monoliths or particles having a lambda value under atmospheric pressure in the range 9-50 mW/m·K at 10° C. together with a low density <400 kg/m³.

According to embodiments, the isocyanate based organic xerogel according to the present invention comprises porous monoliths or particles having a lambda value under atmospheric pressure <25 mW/m·K, preferably <20 mW/m·K, more preferably <16 mW/m·K at 10° C. together with a low density <400 kg/m³.

According to a third aspect of the invention, various uses and applications of the isocyanate based organic xerogel of the present invention are disclosed. A few examples are described hereinafter.

The isocyanate based organic xerogel according to the invention can be blended in the polyisocyanate and/or polyol compositions for use in preparing polyurethane foams. Subsequent foaming leads to foams loaded with solid polyisocyanate-based xerogel particles which may enhance physical/mechanical properties, thermal insulation properties, acoustic insulation properties and fire performance of the resultant foams. This concept can also be used in the preparation of other types of foam such as thermoplastic foams made via an extrusion process.

The isocyanate based organic xerogel monoliths or particles according to the invention can be glued together using binders or adhesives. A block of material is then obtained which consists mainly of isocyanate based organic xerogel. Said blocks can be made by putting the isocyanate based organic xerogel particles in a mould and compressing them with or without temperature increase and optionally under inert atmosphere to make a compacted isocyanate based organic xerogel.

The isocyanate based organic xerogel according to the invention can be combined with other materials (e.g. fillers) to create novel composite materials having improved thermal insulating properties (lower lambda values), improved acoustic insulation properties and/or improved fire retardancy compared to state of the art isocyanate based composites.

The isocyanate based organic xerogel according to the invention can be used for thermal insulation purposes, for example in vacuum panels.

The isocyanate based organic xerogel according to the invention can be used for thermal insulation and/or acoustic insulation. For example to make an acoustic and/or thermal insulation panel or a thermal and/or acoustic encapsulating insulation shield suitable for encapsulating complicated 3D shaped objects.

The independent and dependent claims set out particular and preferred features of the invention. Features from the dependent claims may be combined with features of the independent or other dependent claims as appropriate.

The above and other characteristics, features and advantages of the present invention will become apparent from the detailed description, taken in conjunction with the accompanying examples which illustrate the principles of the invention.

EXAMPLES

Compounds Used:
  Suprasec® 2085 (from Huntsman): a polymeric MDI with NCO=30.5 and an average functionality of 2.9
  Polycat 41 (from Air Products) a tertiary amine catalyst that promotes the polyisocyanurate reaction (trimerization).

Tetrahydrofuran (THF)
n-Pentane
Acetone
Dichloromethane
Water

Comparative Example 1

Synthesis of a PIR Xerogel with THF as Gelling Solvent, and Dried from THF

A PIR xerogel was prepared by mixing the following chemicals in a plastic vial:
1/0.18 g of PIR catalyst (Polycat 41)
2/8.23 g of solvent (THF)
3/0.92 g of MDI (Suprasec 2085)
The vial was then closed and shaken for 6 seconds before being let still to react (PIR reaction). A gel was formed after about 4 hours and aging was carried out for a total of 3 days.
The gel was then cut with a spatula into small particles (~1-10 mm diameter), placed in a 100 mL round bottom flask, and THF was removed at room temperature under vacuum until constant xerogel weight. Dramatic shrinkage was observed during THF evaporation, and a very dense (d>800 kg/m$^3$) PIR xerogel was obtained.

Comparative Example 2

Synthesis of a PIR Xerogel with THF as Gelling Solvent, and Dried from n-Pentane The same procedure was repeated as for Comparative Example 1, except that THF was replaced by n-pentane (5 solvent washes performed over a period of 3 days) before the vacuum drying stage. Significant shrinkage was observed during n-pentane evaporation, and a relatively dense (d~700 kg/m$^3$) PIR xerogel was obtained.

Comparative Example 3

Synthesis of a PIR Xerogel with THF as Gelling Solvent, and Dried from Acetone

The same procedure was repeated as for Comparative Example 1, except that THF was replaced by acetone (5 solvent washes performed over a period of 3 days) before the vacuum drying stage. Significant shrinkage was observed during acetone evaporation, and a very dense (d>800 kg/m$^3$) PIR xerogel was obtained.

Comparative Example 4

Synthesis of a PIR Xerogel with THF as Gelling Solvent, and Dried from Dichloromethane The same procedure was repeated as for Comparative Example 1, except that THF was replaced by dichloromethane (5 solvent washes performed over a period of 3 days) before the vacuum drying stage. Significant shrinkage was observed during dichloromethane evaporation, and a very dense (d>800 kg/m$^3$) PIR xerogel was obtained.

Example 1

Synthesis of a PIR Xerogel According to the Invention Using THF as Gelling Solvent, and Dried from Water The same procedure was repeated as for Comparative Example 1, except that THF was replaced by water (5 solvent washes performed over a period of 3 days) before the vacuum drying stage. Little shrinkage was observed during water evaporation, and a low density (d~220 kg/m$^3$) PIR xerogel was obtained. Specific surface area, measured by Nitrogen adsorption (BET theory), was 227 m$^2$/g.

The invention claimed is:

1. A synthesis method for making an isocyanate based organic xerogel thereby avoiding or reducing gel shrinkage during the solvent removal step, said method comprises at least the following steps:
    a) providing a polyisocyanate composition comprising isocyanates;
    b) providing an isocyanate reactive composition selected from the group consisting of aromatic monol or polyol compounds, polyester monol or polyol compounds, methanol, ethanol, propanol, butanol, cyclohexanol, hydroxy acrylates, ethylene glycol, diethylene glycol, triethylene glycol, propylene glycol, dipropylene glycol, tripropylene glycol, trimethylol propane, glycerol, ethanediol, propanediol, butanediol, pentanediol, hexanediol, polyalkylene polyethers having an average nominal hydroxy functionality of 1-8 and an average molecular weight of 32-8000 g/mol and mixtures thereof;
    c) optionally providing at least one catalyst compound promoting a polyurethane and/or polyurea and/or polyisocyanurate formation;
    d) providing an organic solvent composition that is not reactive towards the isocyanates;
    e) optionally providing further additives;
    f) combining compositions/compounds a), b), d) and optionally c) and/or e) to form a gel comprising a porous cross-linked polyurethane and/or polyurea and/or polyisocyanurate network wherein the pores of the porous cross-linked network are filled with solvent;
    g) optionally removing unreacted species;
    h) exchanging the solvent with water; and
    i) drying the porous network under subcritical conditions in order to remove the water and obtain the isocyanate based organic xerogel.

2. The method according to claim 1, further comprising after step f, a step wherein the obtained gel is a monolithic gel which is optionally broken or grinded into particles having smaller dimensions.

3. The method according to claim 2, further comprising after step f, a step comprising aging the gel.

4. The method according to claim 1 wherein the isocyanates are selected from the group consisting of aliphatic isocyanates, aromatic isocyanates, and mixtures thereof.

5. The method according to claim 1, wherein the isocyanate reactive composition is selected from-polyalkylene polyethers having an average nominal hydroxy functionality of 1-8 and an average molecular weight of 32-8000 g/mol.

6. The method according to claim 1 wherein step f is performed by mixing the reactive mixture at temperatures in the range of from about 10° C. to about 100° C., and then allowing the reactive mixture to form the porous cross-linked network.

7. The method according to claim 1, wherein the catalyst compound is selected from the group consisting of trimerization catalyst, alkali metal and alkaline earth metal hydroxides, alkoxides and carboxylates, lead octoate, symmetrical triazine derivatives, and mixtures thereof.

8. The method according to claim 1, wherein the catalyst compound is selected from the group consisting of aliphatic and aromatic tertiary amines, organometallic compounds, alkali metal salts, and mixtures thereof.

9. The method according to claim 1, wherein step i is performed by air-drying under ambient/atmospheric pressure or drying under vacuum at room temperature or at elevated temperatures in an oven.

10. The method according to claim 1, wherein step h is performed in two steps; (1) replacing the water-immiscible organic gelling solvent by a water-miscible solvent; (2) exchanging the water-miscible solvent with water.

11. The method according to claim 1, wherein the solvents are selected from the group consisting of hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers, and mixtures thereof.

12. The method according to claim 1, wherein the method further comprises after step f, a step of adding one or more functionalization molecules, optionally dissolved in an organic solvent, said functionalization molecules having at least one reactive group (A) being capable of binding to the pore surface of the porous network and at least one functional group (C) capable of providing the porous network with the desired functionalization.

* * * * *